(12) United States Patent
Kretzschmann et al.

(10) Patent No.: US 8,029,696 B2
(45) Date of Patent: Oct. 4, 2011

(54) FUSED NAPHTHALENES

(75) Inventors: Holger Kretzschmann, Rümmelsheim (DE); Rudolf Eidenschink, Mainz (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/375,090

(22) PCT Filed: Jul. 4, 2007

(86) PCT No.: PCT/EP2007/056738
§ 371 (c)(1),
(2), (4) Date: Nov. 12, 2009

(87) PCT Pub. No.: WO2008/012180
PCT Pub. Date: Jan. 31, 2008

(65) Prior Publication Data
US 2010/0059711 A1    Mar. 11, 2010

(30) Foreign Application Priority Data

Jul. 26, 2006  (DE) .................... 10 2006 034 430

(51) Int. Cl.
*C09K 19/00* (2006.01)
*C09K 19/06* (2006.01)
*C09K 19/32* (2006.01)
*C09K 19/20* (2006.01)
*C09K 19/52* (2006.01)

(52) U.S. Cl. .......... 252/299.6; 252/299.01; 252/299.61; 252/299.62; 252/299.63; 252/299.64; 252/299.65; 252/299.66; 252/299.67; 428/1.1; 430/20; 349/167

(58) Field of Classification Search ............ 252/299.01, 252/299.6–299.67; 428/1.1; 430/20; 349/167
See application file for complete search history.

(56) References Cited

U.S. PATENT DOCUMENTS

| 5,648,021 A | 7/1997 | Wingen et al. |
| 7,067,179 B1 | 6/2006 | Ogawa et al. |
| 2004/0099842 A1 | 5/2004 | Klasen-Memmer et al. |
| 2004/0245498 A1 | 12/2004 | Schmidt et al. |

FOREIGN PATENT DOCUMENTS

| DE | 103 13 700 A1 | 10/2004 |
| WO | WO 02/051963 A | 7/2002 |
| WO | WO 2006/012965 | 2/2006 |

*Primary Examiner* — Geraldina Visconti
(74) *Attorney, Agent, or Firm* — Millen, White, Zelano & Branigan, P.C.

(57) ABSTRACT

The invention relates to fused naphthalenes of the general formula I, in which $A_1$, $A_2$, $A_3$, $A_4$, $Q_1$-$Q_2$, $G_1$-$G_2$, $R_1$, $R_2$, $X_1$, $X_2$, $X_3$, $X_4$, $X_5$, $Z_1$, $Z_2$, $Z_3$, $Z_4$, q, r, s and t have the meaning indicated, and to the use thereof as components of liquid-crystalline media and to an electro-optical display element containing them.

(I)

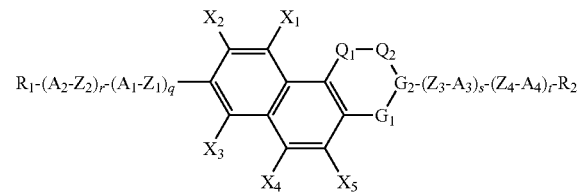

9 Claims, No Drawings

FUSED NAPHTHALENES

The present invention relates to fused naphthalenes of the general formula I

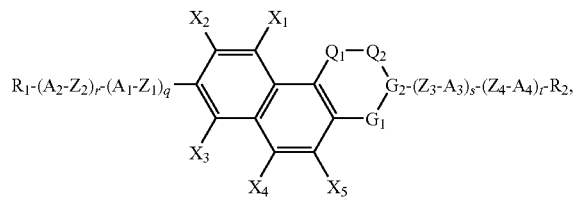

in which $A_1, A_2, A_3, A_4$ each, independently of one another, denote a 1,4-cyclohexylene, 1,4-cyclohexenylene or 1,4-cyclohexadienylene radical which is unsubstituted or substituted by one to four F atoms and in which one or two $CH_2$ groups may each, independently of one another, be replaced by —O— or —S— in such a way that heteroatoms are not linked directly to one another, a 1,4-phenylene radical, which may be substituted by one or two fluorine or chlorine atoms and in which, in addition, one or two CH groups may be replaced by N, or denote a 1,4-bicyclo[2.2.2]octylene radical or a 2,6-spiro[3.3]heptylene radical, $Q_1$-$Q_2$ denotes O—$CH_2$, $CH_2$—O, O—$CF_2$, $CF_2$—O, $CH_2$—$CH_2$, S—$CF_2$, $CF_2$—S, O—CO or CO—O, $G_1$-$G_2$ denotes $CH_2$—CH, $CF_2$—CH, CH=C, CF=C, $R_1, R_2$ each, independently of one another, denote an alkyl radical having 1 to 12 C atoms which is unsubstituted or at least monosubstituted by halogen and in which one or more non-adjacent $CH_2$ groups may each, independently of one another, be replaced by —O—, —S—, —CO—, two adjacent $CH_2$ groups each be replaced by —CH=CH—, —CF=CF—, —COO—, —OOC—, —C≡C—, a 1,2-cyclopropanylene radical, which may also be substituted by two F atoms, or three adjacent $CH_2$ groups may be replaced by a 1,3-cyclobutanylene radical, which may also be substituted by two F atoms, or denote F, Cl, —$OCF_3$, —$OCHF_2$, —CN, —NCS or H, with the proviso that either only $R_1$ or only $R_2$ can be H, $X_1, X_2, X_3, X_4, X_5$ each, independently of one another, denote H, F or Cl, $Z_1, Z_2, Z_3, Z_4$ each, independently of one another, denote the single bond, —$CH_2CH_2$—, —$CH_2O$—, —$OCH_2$—, —$CH_2CF_2$—, —$CF_2CH_2$—, —$CH_2CHF$—, —$CHFCH_2$—, —$CF_2O$—, —$OCF_2$—, —COO—, —OOC—, —CH=CH—, —CF=CF—, —C≡C—, and q,r,s,t each, independently of one another, denote 0 or 1.

The invention furthermore relates to a liquid-crystalline medium comprising at least one compound of the general formula I, and to the use of a liquid-crystalline medium of this type in display elements, in particular electro-optical display elements.

Some organic compounds are not converted directly from the crystalline state into the liquid state on warming, but instead pass through one or more additional phases within clearly limited temperature ranges. These phases have direction-dependent physical properties, but are mobile like liquids. The physical features of such phases (also referred to generally as liquid-crystalline media below), such as the nematic, cholesteric, smectic A or smectic C phase (cf. P. G. deGennes and J. Prost, The Physics of Liquid Crystals, Clarendon Press, Oxford 1993), are known. The molecular structure of such compounds, which are typical for use in electro-optics, is characterised by a rigid skeleton containing, for example, linked 1,4-phenylene or 1,4-cyclohexylene groups or also condensed ring systems, which is substituted by so-called mesogenic radicals, such as alkyl, alkoxy or cyano groups, at points as far away from one another as possible.

The liquid-crystalline media which are used in electro-optics consist of mixtures of such compounds, with compounds which do not have an enantiotropic transition from the crystalline phase to a liquid-crystalline phase also being used. In the case of the nematic phase, the optical and dielectric properties have to a first approximation, as is known, a linear dependence on the proportion of the mixture components. In general, the curves of the values for anisotropic-physical quantities for different compounds or mixtures of compounds are similar if they are plotted against the so-called reduced temperature $T_R$ ($T_R = T_M/T_C$, $T_m$ is the measured temperature, $T_C$ is the clearing temperature, i.e. the temperature of the transition from the nematic phase to the isotropic phase (all in K)). The contribution of a component to the anisotropic properties can therefore be determined by comparison at the same $T_R$.

In the display elements based on liquid-crystalline media (liquid-crystal displays), the change in an optical impression is, as is known, caused by application of an electric field to electrodes between which a liquid-crystalline medium is located. The well-known electro-optical display elements based on the principle of the twisted nematic cell (TNC) are particularly important. Interactions with the surfaces of the electrodes cause the molecules of a nematic phase to align in such a way that they adopt a helical arrangement. This rotates the polarisation plane of light passing through, so that the element appears transparent between two crossed polarisation foils. Application of a voltage to the electrodes causes the molecules to align perpendicularly. The prerequisite for this is a positive dielectric anisotropy ($\Delta\epsilon > 0$). The known method of in-plane switching (IPS), in which the helical arrangement of the molecules can be converted into a parallel arrangement, enables particularly high-contrast images to be produced. Electro-optical display elements which manage without backlighting and with only one polarisation foil appear particularly advantageous. Reflective electro-optical display elements of this type having a high information density, low addressing voltage and a low dependence of the contrast on the viewing angle are described in Y. Itoh et al., SID 98 Digest, 221. In these, observance of an optimum value for the product of the optical anisotropy $\Delta n$ of the nematic phase and its layer thickness d is crucial for a low dependence of the contrast on the viewing angle. The quality of the images or alphanumeric information displayed is, as is known, better in the said applications the higher the specific electrical resistance of the liquid-crystalline medium. This applies in particular to the operation of active-matrix displays. The ability of a driving element consisting of a thin-film transistor to maintain an electric voltage after the voltage source has been switched off is represented in general by the voltage holding ratio (VHR). For applications outside closed spaces, which are becoming ever more important, liquid-crystalline media having particularly high clearing points are required. The electrical addressing of the pixels can, as is known, be set up advantageously at low threshold voltages. These threshold voltages are determined by known methods, based on the so-called Frederiks threshold (measured in volts) for nematic phases where Δε>0 and on the so-called DAP (deformation of aligned phases) threshold for those where Δε<0. The number of possible image changes per time unit is dependent on the mobility of the molecules in a liquid-crystalline medium, which decreases rapidly as the temperature drops. For TNCs, the response time is directly dependent on the rotational viscosity of the liquid-crystalline medium, which in turn correlates with the values which can be measured in conventional capillary viscometers. Also known are electro-optical display elements which are based on the realignment of ferroelectric or antiferroelectric layers of smectic C phases. The known polymer dispersed liquid crystals (PDLCs) consist of droplets of liquid-crystalline media dispersed in a transparent polymer, which scatter the incident light as a function of an applied voltage. Electro-optical display elements which likewise do not require polarisation foils can be produced using liquid-crystalline media which have a negative dielectric anisotropy and comprise dichroic dyes. Electro-optical display elements based on the modulation of polarised light in nematic liquid-crystalline media having negative dielectric anisotropy (Δε<0) in accordance with the VA (vertical alignment) technique have become particularly important recently.

The liquid-crystalline media used in the above-mentioned display elements have a number of disadvantages since the compounds used as mixture components are not sufficiently stable to light, the action of heat or in electric fields. In addition, the optical anisotropies required for good contrast can only be achieved with difficulty with them at the same time as favourable operating voltages and response times.

The known liquid-crystalline media exhibit properties which are still in need of improvement in electro-optical display elements. In particular, the achievable threshold voltages and the response times are still too high.

In particular, the invention was based on the object of providing a class of stable compounds which facilitate the production of electro-optical display elements having low threshold voltages and short response times.

Surprisingly, it has been found that the fused naphthalenes of the general formula I are advantageously suitable as components of liquid-crystalline media. Stable liquid-crystalline media having particularly low threshold voltages and short response times which are eminently suitable for the above-mentioned applications can be prepared from them. Owing to their high VHR, the fused naphthalenes according to the invention are particularly suitable for the production of active-matrix displays. They have high clearing temperatures and are particularly stable on exposure to light and at temperatures above 120° C. The compounds according to the invention generally broaden the range of liquid-crystalline substances for the preparation of advantageous liquid-crystalline media for various applications, in particular those mentioned above.

The fused naphthalenes of the formula I according to the invention encompass the 1,2,3,4-tetrahydrophenanthrenes Ia

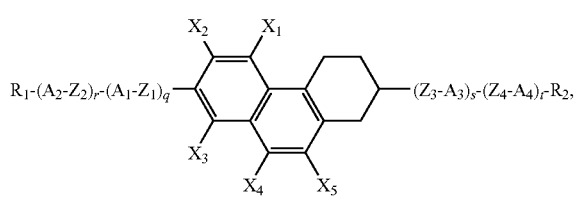

the 3,4-dihydro-2H-benzo[h]chromenes Ib

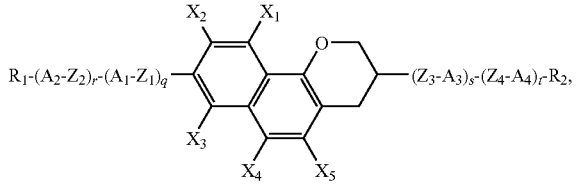

the 2,2-difluoro-3,4-dihydro-2H-benzo[h]chromenes Ic

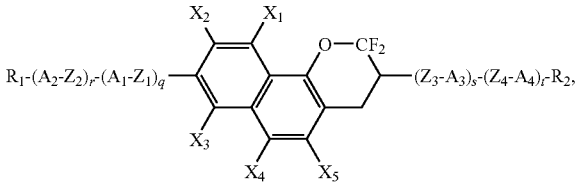

the 3,3,4,4-tetrafluoro-1,2,3,4-tetrahydrophenanthrenes Id

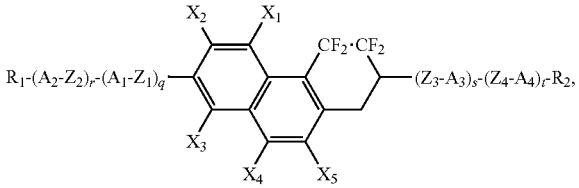

the 1-fluoro-3,4-dihydrophenanthrenes Ie

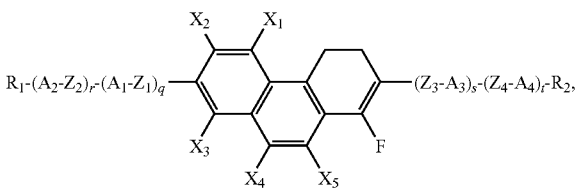

and the 2,2-difluoro-2H-benzo[h]chromenes If

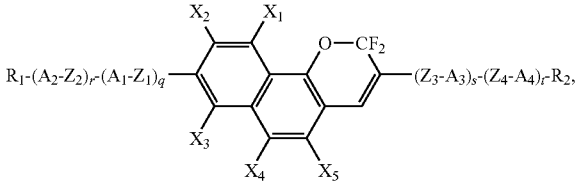

all of which are preferred. Particular preference is given to the compounds of the formulae Ib and Ic.

In the compounds of the formula I, $A_1$, $A_2$, $A_3$, $A_4$ each, independently of one another, preferably denote 1,4-phenylene radicals or 1,4-cyclohexylene radicals which are unsubstituted or substituted by one to two F atoms and in which one $CH_2$ group may in each case, independently of one another, be replaced by —O—, where the 1,4-cyclohexylene and 2,5-tetrahydropyranylene groups preferably have the trans configuration:

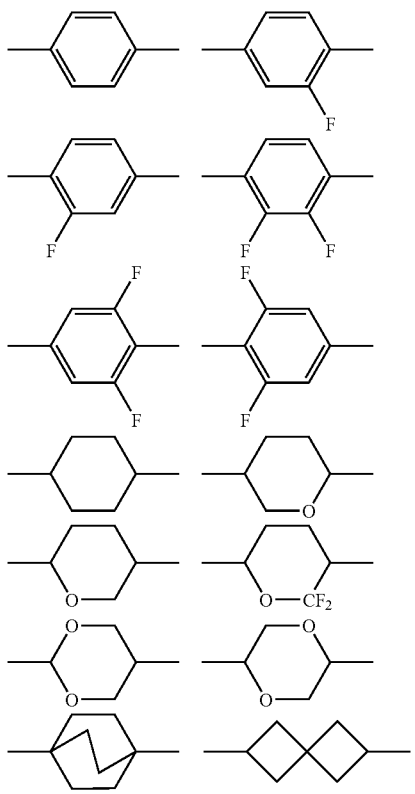

The alkyl radicals encompassed by the radicals $R_1$ and $R_2$ of the general formula I may be straight-chain or branched. They are preferably straight-chain and then denote methyl, ethyl, propyl, butyl, pentyl, hexyl, heptyl, octyl, nonyl, decyl, undecyl or dodecyl. They can then be expressed by —$(CH_2)_u$H. If two $CH_2$ groups herein are replaced by a 1,2-cyclopropylene group or three CH2 groups is replaced by a 1,3-cyclobutylene group, these groups may each contain two F atoms, for example, thus for example,

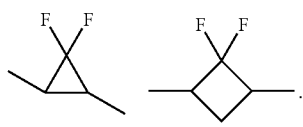

If the double bonds of the alkenyl radicals likewise encompassed are not terminal, they preferably have the E configuration. The meanings of F and Cl for $R_1$ and $R_2$ are likewise preferred if these substituents are bonded to a phenyl radical.

$Q_1$-$Q_2$ preferably denotes O—$CH_2$, O—$CF_2$ or $CH_2CH_2$, where O—$CH_2$ and O—$CF_2$ are particularly preferred.

$G_1$-$G_2$ preferably denotes $CH_2$—CH.

In formula I, $X_1$, $X_2$, $X_3$, $X_4$, $X_5$ each, independently of one another, denote H, F or Cl, preferably H or F, where the meaning $X_1$=$X_2$=F, $X_3$=$X_4$=$X_5$=H is a particularly preferred combination.

$Z_1$, $Z_2$, $Z_3$, $Z_4$ in the general formula I preferably each, independently of one another, denote the single bond, —$CH_2CH_2$—, —$OCF_2$— or —$CF_2O$—, of which the single bond is particularly preferred.

The indices q, r, s, t each, independently of one another, denote one or zero, so that formula I may contain zero to four radicals having the meaning $A_1$, $A_2$, $A_3$, $A_4$. Preference is given to compounds of the formula I in which the sum of q, r, s and t is equal to 1 or 2, i.e. one or two cyclic radicals having the meaning $A_1$, $A_2$, $A_3$, $A_4$ are present in addition to the skeleton of the fused naphthalene according to the invention. Particular preference is given to compounds for which the sum of q and r is 1 or 2 and at the same time the sum of s and t is zero or 1.

The formula I also encompasses optically active compounds and racemates thereof if their $G_1$-$G_2$ does not contain a double bond. The former can be obtained by specific asymmetric syntheses or from the optically inactive compounds according to the invention by separation by column chromatography on a chiral support material, for example cyclodextrins. The optically active compounds of the formula I are particularly suitable for phases having ferroelectric and antiferroelectric properties and for the preparation of cholesteric phases.

Compounds of the formula I in which the bonded elements have a distribution of their isotopes other than the natural distribution are also encompassed.

Some compounds of the formula I are shown below, where $R_1$ and R2 have the meanings indicated.

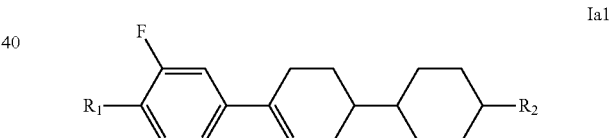

Ia1

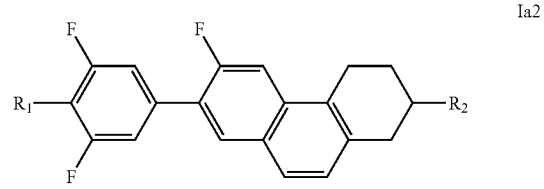

Ia2

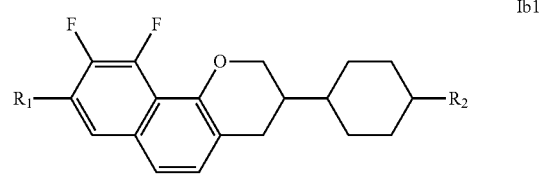

Ib1

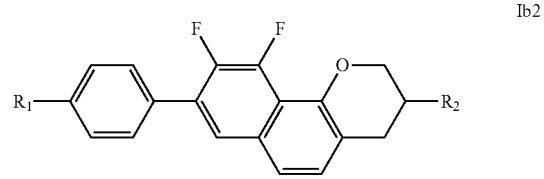

Ib2

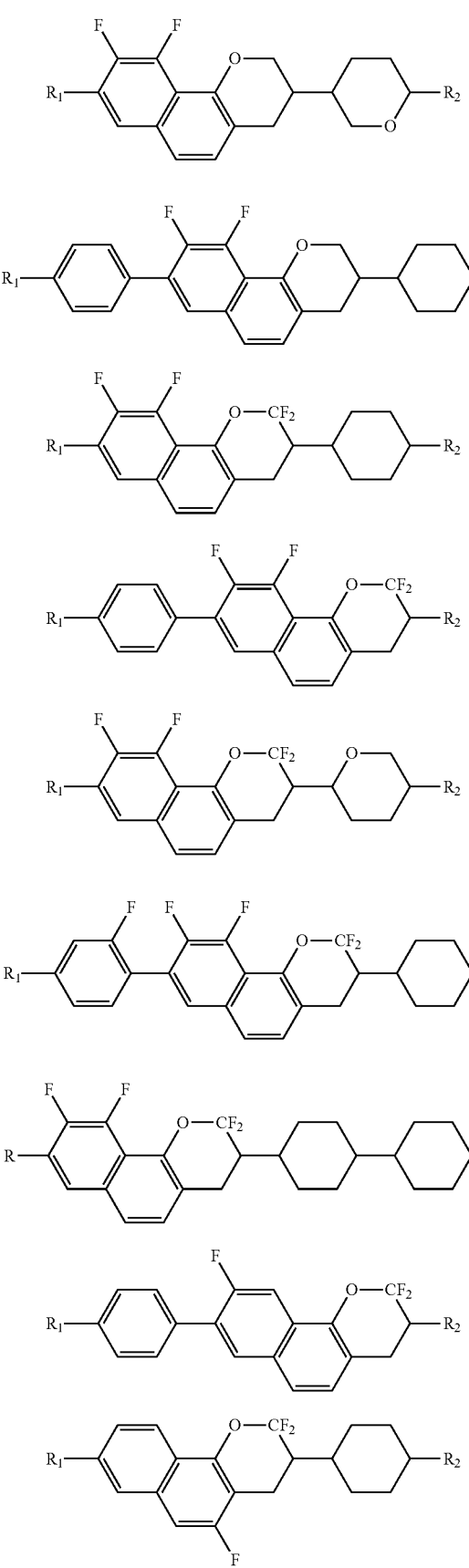
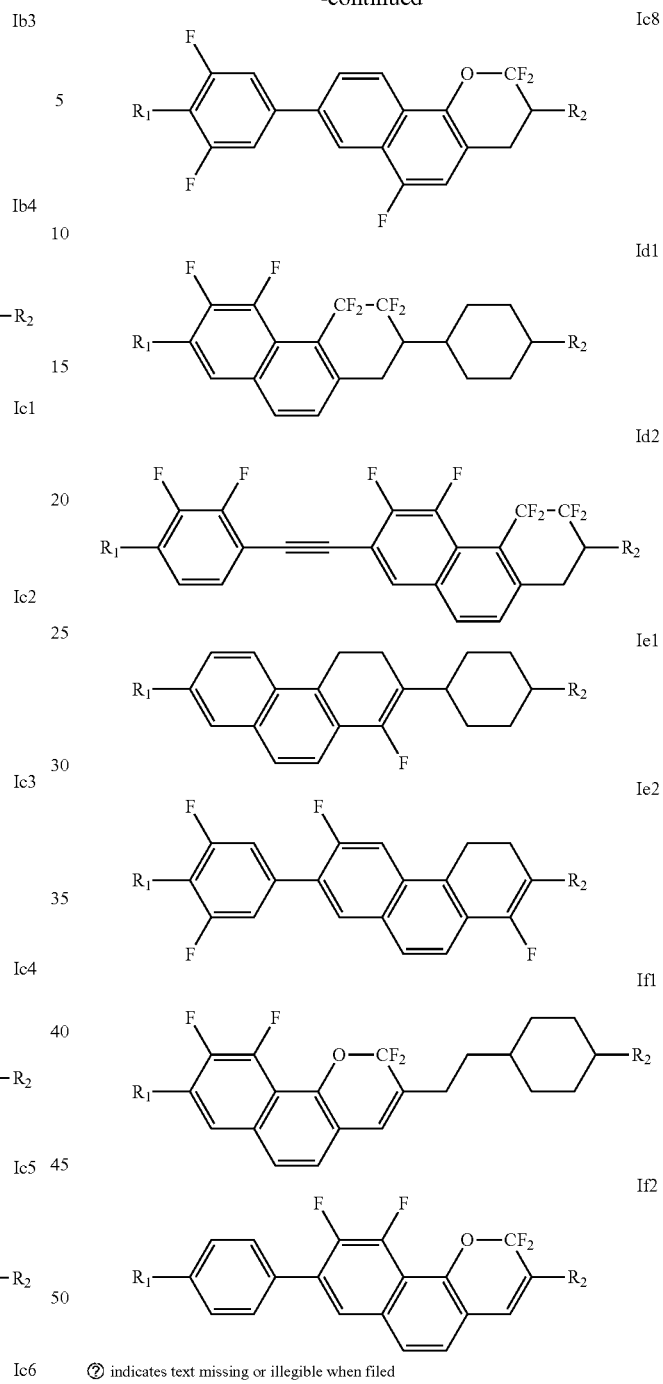

The compounds of the general formula I are prepared by generally known methods. These are given, for example, in the compilation Houben-Weyl, Methoden der organischen Chemie [Methods of Organic Chemistry], Georg Thieme Verlag, Stuttgart, and other publications available to the person skilled in the art. Experimental details on the Suzuki and Heck couplings shown below are revealed in the monograph J. Tsuji, Palladium Reagents and Catalysts, John Wiley & Sons, Chichester, 2004, and the literature cited therein.

The linking of an iodine-, bromine- or chlorine- (denoted by Y here) substituted fused naphthalene of the form

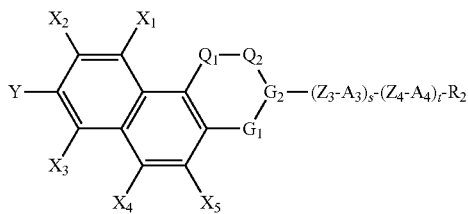

abbreviated as Y—Ar, by a generally known Suzuki coupling to a boronic acid is favourable.

Synthesis Scheme 1

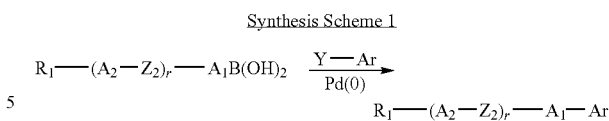

The $B(OH)_2$ radical on the naphthalene ring can also be fixed (cf. Synthesis Scheme 3). Besides Suzuki couplings to aromatic halogen compounds to give compounds of the general formula I or precursors thereof, conversion into a phenol by boiling with $H_2O_2$ solution and subsequent reaction with an alkyl bromide in the presence of a base to give an alkoxy compound according to the invention is also possible.

Synthesis Scheme 2

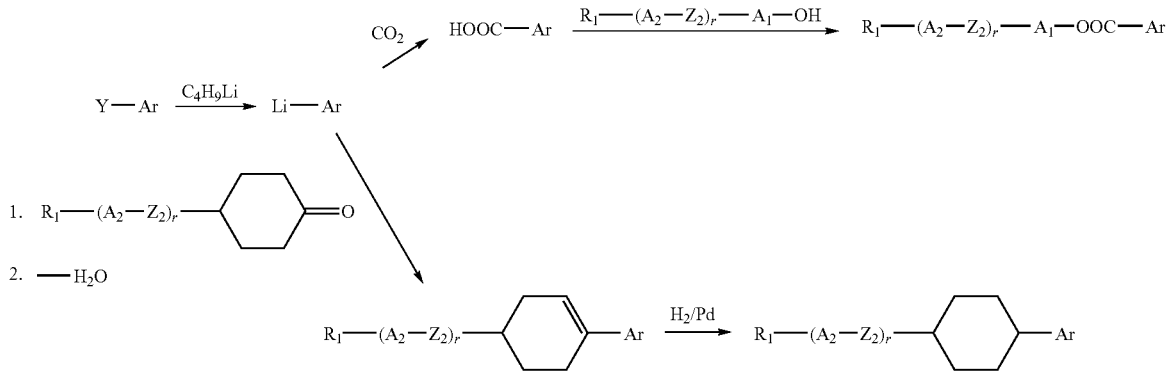

Halogen-metal exchange (for example bromine-lithium exchange) with subsequent addition onto a C=O bond likewise leads, after well-known subsequent reactions, to compounds of the general formula I (Synthesis Scheme 2).

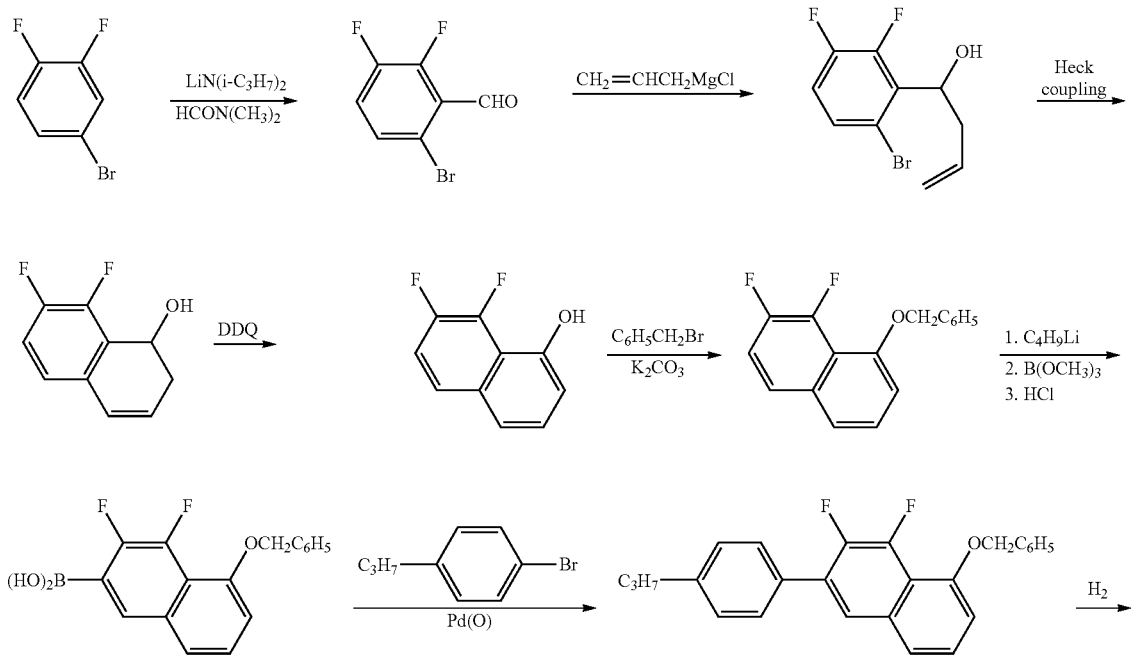

-continued

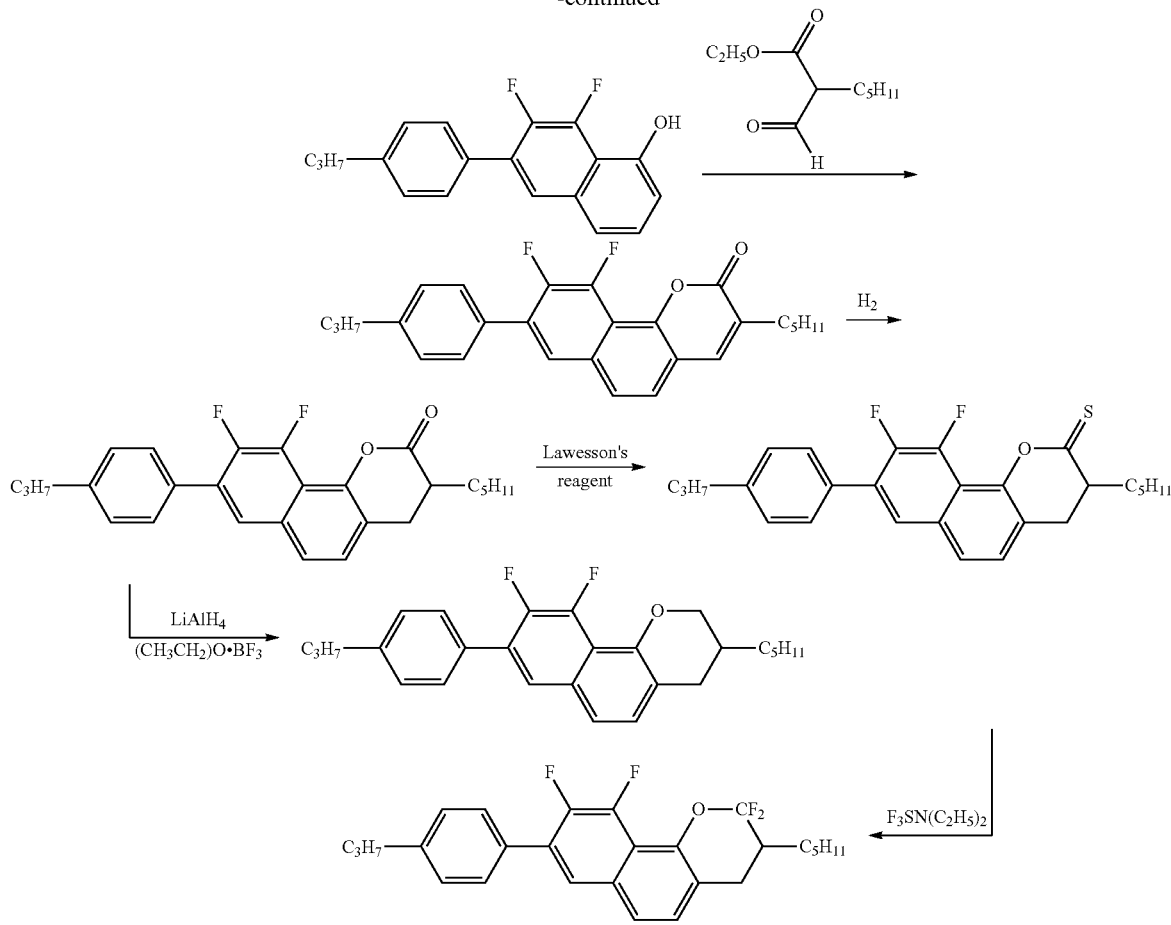

⊙ indicates text missing or illegible when filed

Synthesis Scheme 3 shows by way of example a sequence of generally known synthetic steps to give compounds of the sub-formulae Ib and Ic. The substituted benzaldehyde obtainable from commercial 3,4-difluorobromobenzene by metallation using lithium diisopropylamide (LDA) in tetrahydrofuran (THF) and subsequent reaction with dimethylformamide is converted, using allylmagnesium chloride, into an allylbenzyl alcohol, which, after addition of [P(o-tolyl)$_3$]PdCl$_2$, undergoes a Heck coupling to give a hydroxydihydronaphthalene, which is subsequently aromatised by an oxidant. Benzylation using benzyl bromide in acetone in the presence of potassium carbonate results in a benzyl ether, which can be lithiated in THF. Reaction of the lithium compound with trimethyl borate and subsequent acidification gives, in a generally known manner, a boronic acid, which is converted into arylnaphthalenes by reaction with aryl halides of the form $R_1(A_2—Z_2)_r—A_1—Hal$, where $R_1$, $A_1$, $A_2$ and $Z_1$ have the meanings applying within the present invention, and Hal denotes Cl, Br or I, using known suitable catalysts. Catalytic hydrogenolysis produces a 1-naphthol, which is reacted with a substituted methyl formylacetate (cf. K. Chebaane et al., Bull. Soc. Chim. France 1975, 2516) to give the benzocoumarine encompassed by the invention, which can be converted by catalytic hydrogenation into the dihydro derivative, which is likewise encompassed by the formula I. The latter compound can be converted into a compound of the formula Ib in a likewise generally known manner by reduction using LiAlH$_4$ or NaBH$_4$ and BF$_3$ etherate or into a compound of the general formula Ic by reaction with Lawesson's reagent and subsequent conversion of the CS group into a CF$_2$ group using diethylaminosulfur trifluoride (DAST) (cf. S. Scheibye et al., Tetrahedron 35, 1339 (1979)).

A route to compounds of the formula If leads from the dihydrocoumarine from Scheme 3 (Synthesis Scheme 4).

Synthesis Scheme 4

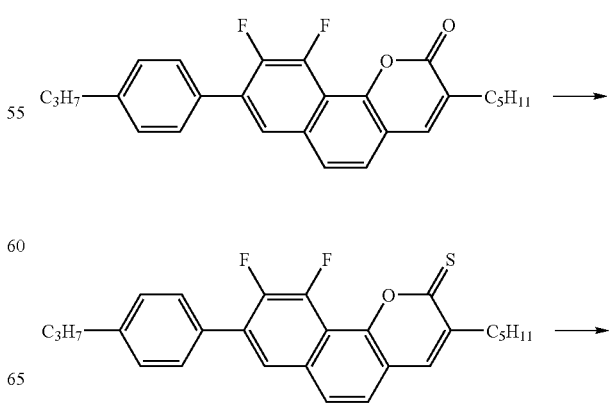

-continued

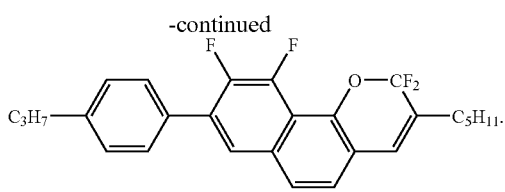

Compounds of the formula Ia are accessible according to Synthesis Scheme 5 from substituted naphthalenes by ring closure by means of a Friedel-Crafts acylation (cf. B. Hulin, M. Koreeda, J. Org. Chem. 49, 207 (1984)).

Synthesis Scheme 5

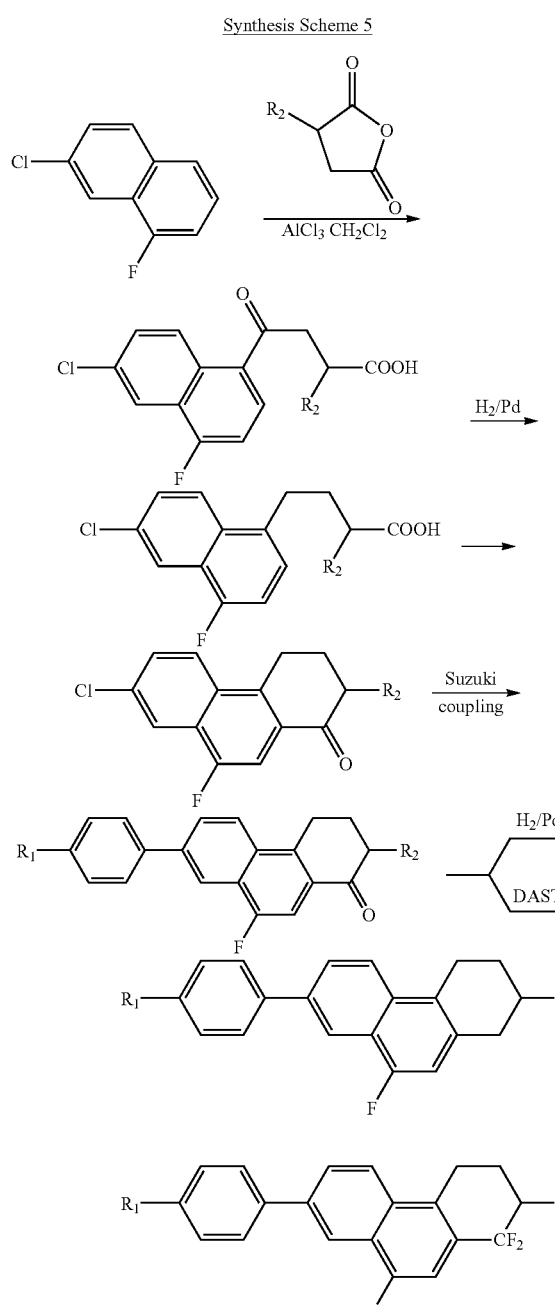

The liquid-crystalline medium likewise encompassed by the invention consists of at least two liquid-crystalline com- ponents and comprises as component at least one compound of the general formula I. It typically comprises one to five, preferably two to four, compounds of the formula I. Further mixture components of the liquid-crystalline medium according to the invention can be the generally known mesogenic compounds, i.e. compounds which are capable, in pure form or mixed with other components, of the formation of liquid-crystalline phases. Some compounds of this type are mentioned, for example, in DE 19804894 and WO 2005/037957. The most important are built up in accordance with the general formula II $$U_1\text{-}(B_1\text{-}Y_1)_m\text{-}(B_2\text{-}Y_2)_n\text{-}B_3\text{-}U_2 \qquad \text{II}$$

in which $B_1$ to $B_3$ each, independently of one another, denote unsubstituted or halogen- or —CN-substituted 1,4-cyclohexylene radicals, in which one or two $CH_2$ groups may be replaced by —O—, 4-bicyclo[2.2.2]octylene radicals, 1,4-phenylene radicals and 2,5-pyrimidinylene radicals as well as 2,6-naphthalenylene, 1,2,3,4-tetrahydronaphthalen-2,4-ylene or indan-2,5-ylene radicals, $U_1$, $U_2$, independently of one another, denote alkyl or alkenyl radicals having 1 to 12 C atoms which are unsubstituted or substituted by at least one halogen atom and in which one or more non-adjacent $CH_2$ groups may be replaced by —O— or —S—, or denote —CN, —OCHF$_2$, —OCF$_3$, —SF$_5$, —F, —Cl, —OCH=CF$_2$, —N=C=S, $Y_1$, $Y_2$, independently of one another, denote —CH$_2$CH$_2$—, —COO—, —CH=CH—, —OCF$_2$—, the single bond, and m, n denote 0, 1 or 2.

Mention may be made by way of example of the following as mixture components in which the alkyl groups mentioned are representative of alkyl groups having 1 to 12 C atoms, in which 1 or 2 $CH_2$ groups are replaced by —O— or —CH=CH—:

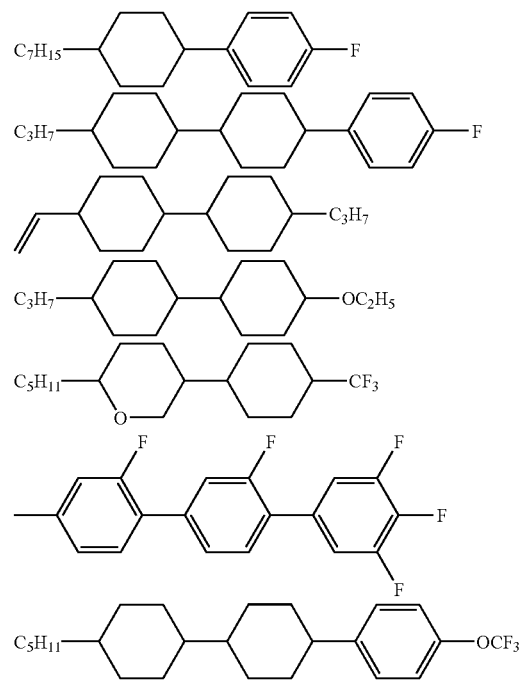

-continued

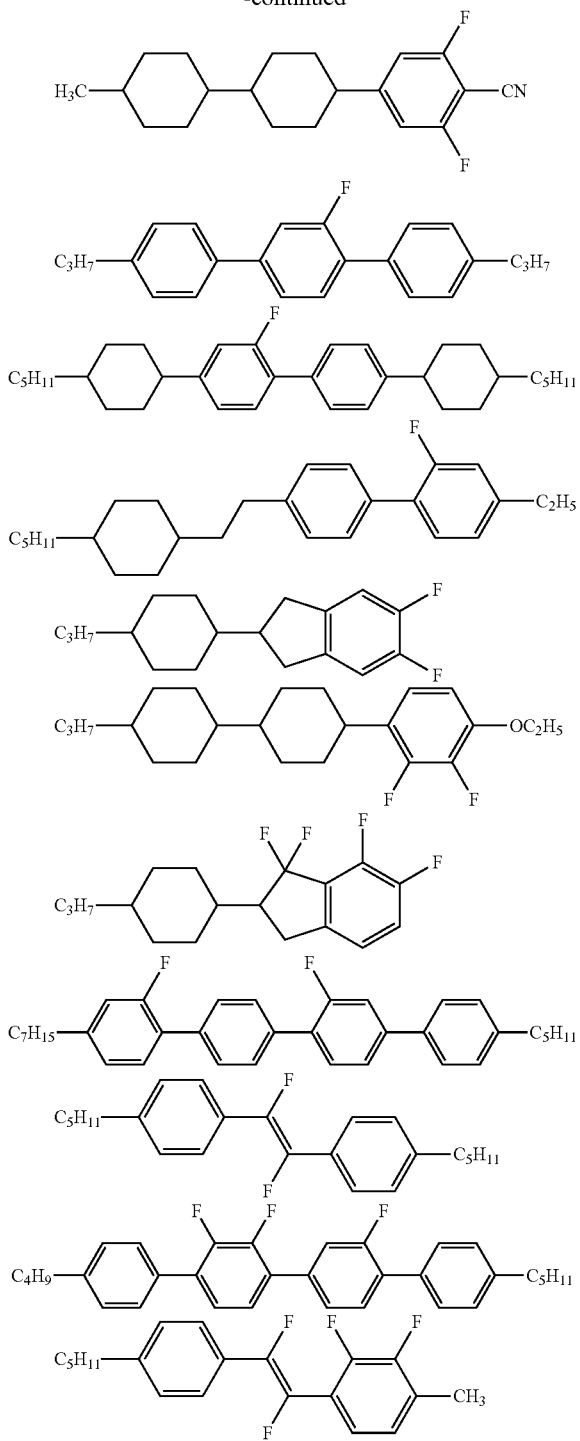

However, it is also possible to add further mixture components, such as dichroic dyes, chiral compounds which are not encompassed by the invention, conductive salts and gel-forming polymers or amorphous solids, such as pyrogenic silicic acids. The addition of oxidation inhibitors is also possible.

The liquid-crystalline media according to the invention are prepared by warming the components together to 80° C. in a suitable glass vessel, mixing them by stirring and allowing the mixture to cool to room temperature. The proportion of fused naphthalenes of the general formula I in the liquid-crystalline medium according to the invention can be between 1 and 99 per cent by weight. It is preferably between 10 and 90 per cent by weight and particularly preferably between 15 and 50 per cent by weight.

The following examples are intended to explain the invention without restricting it. All percentages denote per cent by weight. The temperatures are indicated below in degrees Celsius. m.p. denotes melting point, h denotes hours, min denotes minutes. Cr denotes crystalline phase, Sm denotes smectic phase, Ne denotes nematic phase and Is denotes isotropic phase. The numbers between these symbols indicate the temperature at which a transition between the phases indicated takes place. IR stands for infrared spectrum, KBr means that the spectrum was recorded using a conventional potassium bromide disc. Unless indicated otherwise, the alkyl radicals are n-alkyl radicals.

EXAMPLES 1 TO 4

In accordance with Synthesis Scheme 3, 1.1 times the molar amount of solid LDA are added to commercially available 3,4-difluorobromobenzene in THF at −60° C. under nitrogen.

1.15 times the molar amount, relative to the bromine compound, of N,N-dimethylformamide (DMF) are added to the resultant solution of the aryllithium compound at −60° C.

After 3 h, the mixture is warmed to room temperature, water is added, and 2-bromo-5,6-difluorobenzaldehyde is isolated as an oily residue by extracting the aqueous phase by shaking with diethyl ether, drying the organic phase using sodium sulfate and removing the solvent by distillation (referred to below as conventional work-up). Reaction of this compound with an equimolar amount of allylmagnesium chloride in THF at room temperature and addition of saturated aqueous ammonium chloride solution and conventional work-up gives crude 4-(2-bromo-5,6-difluorophenyl)-4-hydroxybut-1-ene. Purification by column chromatography (silica gel 60 (Merck KGaA), eluent toluene with 10 per cent by volume of isopropanol) and evaporation of the main fraction gives pure product. The intramolecular Heck coupling is carried out at 140° C. in DMF after addition of sodium acetate, benzyltriethylammonium chloride and [P(o-tolyl)$_3$] PdCl$_2$ as catalyst. After cooling to room temperature and dilution with water, the mixture is subjected to conventional work-up. The crude material is aromatised in a generally known manner by boiling with 2,3-dichloro-5,6-dicyanobenzoquinone in dichloromethane to give 1-naphthol, which is then converted into the benzyl ether in a suspension of an excess of potassium carbonate in acetone using benzyl bromide. The benzyl ether is dissolved in THF, lithiated in a generally known manner at −60° C. using butyllithium, and trimethyl borate is subsequently added to the dissolved organometallic compound. The boronic acid precipitating after acidification using dilute hydrochloric acid is recrystallised from n-heptane. It is subsequently dissolved in THF and, after addition of 4-propylbromobenzene and a catalytic amount of Pd[P(C$_6$H$_5$)$_4$], coupled by the Suzuki method. The generally known hydrogenolysis using hydrogen in the presence of palladium (5% Pd on carbon) gives the corresponding 1-naphthol. This is dissolved in an adequate volume of ethanol at about −10° C. together with 1.1 times the molar amount of ethyl pentylformylacetate, and the solution is saturated with gaseous hydrogen chloride. The mixture is warmed to room temperature and left to stand for about 20 h. The mixture is then poured onto ice, and the 3-pentyl-8-(4-propylphenyl) benzo[h]chromen-2-one which deposits (Example 1) is recrystallised from ethanol. Hydrogenation with Pd catalysis in THF gives 3-pentyl-8-(4-propylphenyl)-3,4-dihydrobenzo[h]chromen-2-one (Example 2), which, after removal of the catalyst by filtration and removal of the solvent by distillation, is purified by recrystallisation from ethanol. This gives, in a generally known manner by reaction with LiAlH$_4$ and boron trifluoride etherate (cf. R. Pettit et al., J. Org. Chem. 26, 4773 (1961)), 3-pentyl-8-(4-propylphenyl)-3,4-dihydrobenzo[h]chromene (Example 3). The compound of Example 2 is converted into the corresponding thione by reaction with 2,4-bis(4-methoxyphenyl)-1,3-dithia-2,4-diphosphetane 2,4-disulfide (Lawesson's reagent) (cf. P. S. Pederson et al., Bull. Soc. Chim. Belg. 87, 293 (1978)), from which 2,2-difluoro-3-pentyl-8-(4-propylphenyl)-3,4-dihydrobenzo[h]chromene is formed in a generally known manner by reaction with DAST in dichloromethane (Example 4). The compounds of Examples 3 and 4 are, for purification, in each case recrystallised from ethanol after conventional work-up.

EXAMPLE 5

A further illustrative compound can be prepared in a few synthetic steps after reaction of ethyl 2-(4-ethoxyphenyl)-3-oxopropanoate with 1,6-dihydroxynaphthalene in accordance with the following synthesis scheme (cf. D. F. Taber et al., J. Org. Chem. 54, 3831 (1989)):

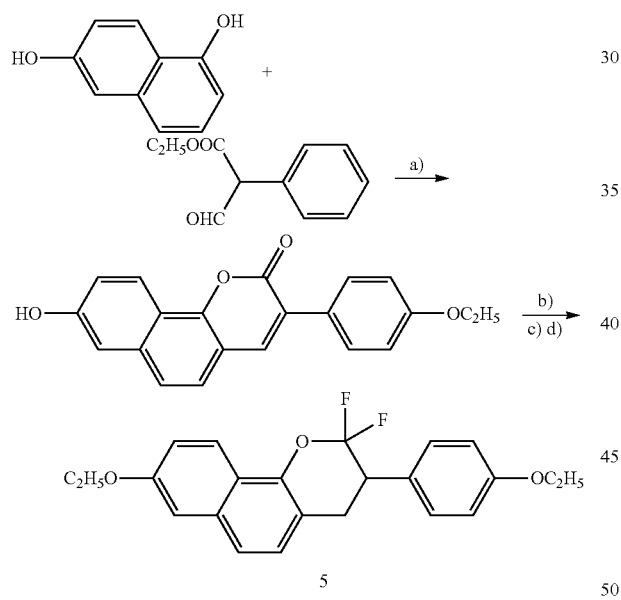

EXAMPLES 6 TO 11

The following are likewise synthesised by generally known methods:

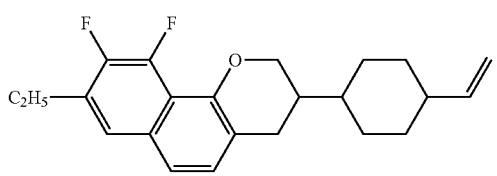

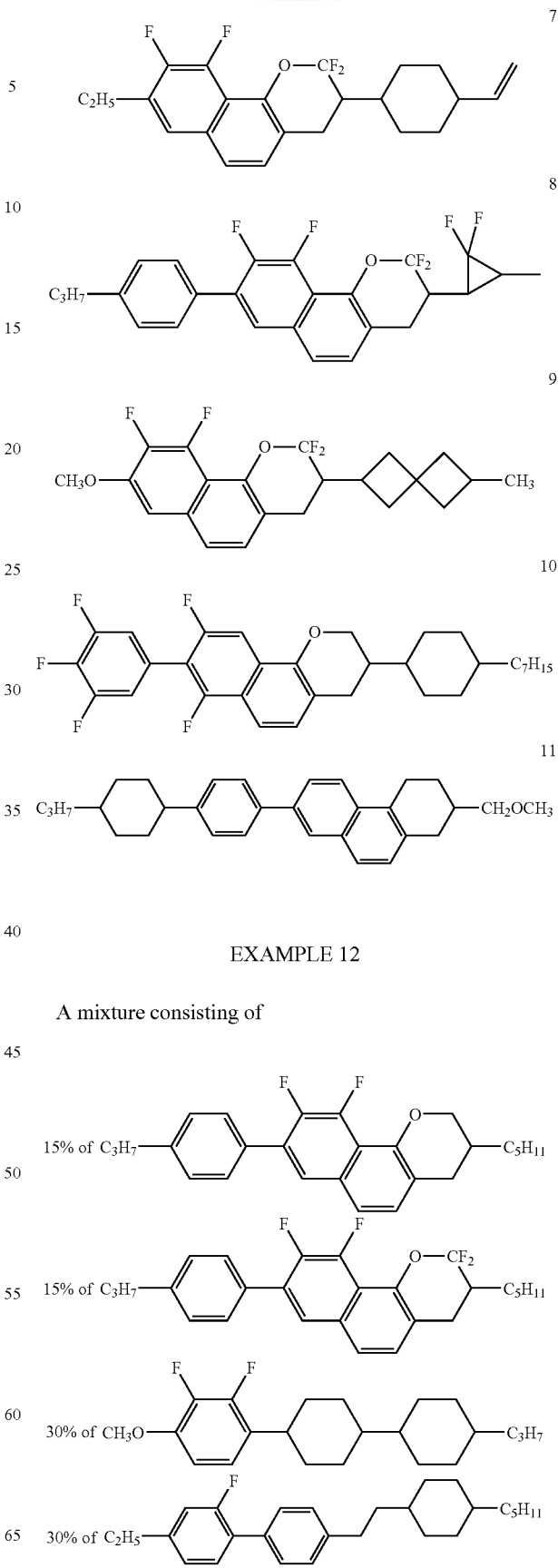

EXAMPLE 12

A mixture consisting of

-continued

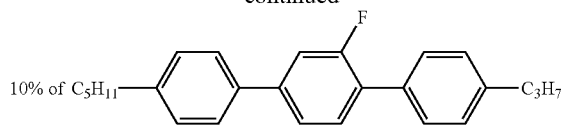

is nematic at room temperature and has a DAP threshold of <5 V. It is suitable for VA technology electro-optical display elements.

The invention claimed is:

1. A fused naphthalene of the formula I

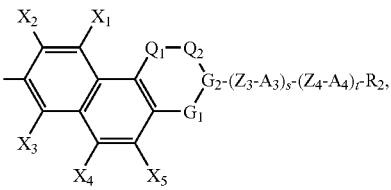

in which
- $A_1, A_2, A_3, A_4$ each, independently of one another, denote a 1,4-cyclohexylene, 1,4-cyclohexenylene or 1,4-cyclohexadienylene radical which is unsubstituted or substituted by one to four F atoms and in which one or two $CH_2$ groups may each, independently of one another, be replaced by —O— or —S— in such a way that heteroatoms are not linked directly to one another, a 1,4-phenylene radical, which may be substituted by one or two fluorine or chlorine atoms and in which, in addition, one or two CH groups may be replaced by N, or denote a 1,4-bicyclo[2.2.2]octylene radical or a 2,6-spiro[3.3]heptylene radical,
- $Q_1$-$Q_2$ denotes O—$CH_2$, or O—$CF_2$,
- $G_1$-$G_2$ denotes $CH_2$—CH, $CF_2$—CH, CH=C, CF=C,
- $R_1, R_2$ each, independently of one another, denote an alkyl radical having 1 to 12 C atoms which is unsubstituted or at least monosubstituted by halogen and in which one or more non-adjacent $CH_2$ groups may each, independently of one another, be replaced by —O—, —S—, —CO—, two adjacent $CH_2$ groups may each be replaced by —CH=CH—, —CF=CF—, —COO—, —OOC—, —C≡C—, a 1,2-cyclopropanylene radical, which may also be substituted by two F atoms, or three adjacent $CH_2$ groups may be replaced by a 1,3-cyclobutanylene radical, which may also be substituted by two F atoms, or denote F, Cl, —$OCF_3$, —$OCHF_2$, —CN, —NCS or H, with the proviso that either only $R_1$ or only $R_2$ can be H,
- $X_1, X_2, X_3, X_4, X_5$ each, independently of one another, denote H, F or Cl,
- $Z_1, Z_2, Z_3, Z_4$ each, independently of one another, denote the single bond, —$CH_2CH_2$—, —$CH_2O$—, —$OCH_2$—, —$CH_2CF_2$—, —$CF_2CH_2$—, —$CH_2CHF$—, —$CHFCH_2$—, —$CF_2O$—, —$OCF_2$—, —COO—, —OOC—, —CH=CH—, —CF=CF—, —C≡C—, and
- q,r,s,t each, independently of one another, denote 0 or 1.

2. The fused naphthalene according to claim 1, wherein $Q_1$-$Q_2$ has the meaning O—$CH_2$.

3. The fused naphthalene according to claim 1, wherein $Q_1$-$Q_2$ has the meaning O—$CF_2$.

4. The fused naphthalene according to claim 1 of the formula

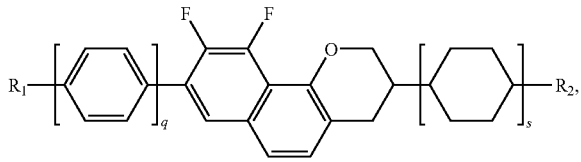

in which $R_1$, $R_2$, q and s have the meaning indicated.

5. The fused naphthalene according to claim 1 of the formula

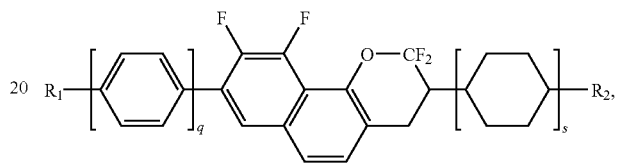

in which $R_1$, $R_2$, q and s have the meaning indicated.

6. A method of using compounds of the formula I according to claim 1 comprising employing said compounds as components of liquid-crystalline media.

7. A liquid-crystalline medium having at least two liquid-crystalline components, comprising at least one compound according to claim 1.

8. An electro-optical display element, comprising a liquid-crystalline medium according to claim 7.

9. A fused naphthalene of formula I

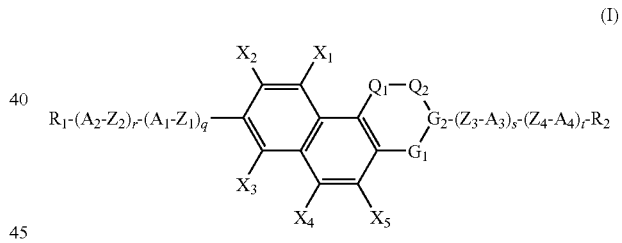

in which
- $A_1, A_2, A_3, A_4$ each, independently of one another, denote a 1,4-cyclohexylene, 1,4-cyclohexenylene or 1,4-cyclohexadienylene radical which is unsubstituted or substituted by one to four F atoms and in which one or two $CH_2$ groups may each, independently of one another, be replaced by —O— or —S— in such a way that heteroatoms are not linked directly to one another, a 1,4-phenylene radical, which may be substituted by one or two fluorine or chlorine atoms and in which, in addition, one or two CH groups may be replaced by N, or denote a 1,4-bicyclo[2.2.2]octylene radical or a 2,6-spiro[3.3]heptylene radical,
- $Q_1$-$Q_2$ denotes O—$CH_2$, $CH_2$—O, O—$CF_2$, $CF_2$—O, $CH_2$—$CH_2$, S—$CF_2$, $CF_2$—S, O—CO or CO—O,
- $G_1$-$G_2$ denotes $CH_2$—CH, $CF_2$—CH, CH=C, CF=C,
- $R_1, R_2$ each, independently of one another, denote an alkyl radical having 1 to 12 C atoms which is unsubstituted or at least monosubstituted by halogen and in which one or more non-adjacent $CH_2$ groups may each, independently of one another, be replaced by —O—, —S—, —CO—, two adjacent $CH_2$ groups may each be replaced by —CH=CH—, —CF=CF—, —COO—, —OOC—, —C≡C—, a 1,2-cyclopropanylene radical, which may also be substituted by two F atoms, or three adjacent $CH_2$ groups may be replaced by a 1,3-cyclobutanylene radical, which may also be substituted by two F atoms, $X^1$ and $X^2$, are F, $X^3$, $X^4$ and $X^5$ are H $Z_1, Z_2, Z_3, Z_4$ each, independently of one another, denote the single bond, —$CH_2CH_2$—, —$CH_2O$—, —$OCH_2$—, —$CH_2CF_2$—, —$CF_2CH_2$—, —$CH_2CHF$—, —$CHFCH_2$—, —$CF_2O$—, —$OCF_2$—, —COO—, —OOC—, —CH=CH—, —CF=CF—, —C≡C—, and q,r,s,t each, independently of one another, denote 0 or 1.

* * * * *